(12) United States Patent
Zhang et al.

(10) Patent No.: US 12,738,505 B2
(45) Date of Patent: Sep. 15, 2026

(54) ADDITIVE FOR LITHIUM ION BATTERY AND USE THEREOF

(71) Applicant: JiangXi Inspire Nano Materials Co., Ltd, Shangrao (CN)

(72) Inventors: Xiaohong Zhang, Shangrao (CN); Xiang Zeng, Shangrao (CN); Chao Zhang, Shangrao (CN)

(73) Assignee: JiangXi Inspire Nano Materials Co., Ltd, Shangrao (CN)

(*) Notice: Subject to any disclaimer, the term of this patent is extended or adjusted under 35 U.S.C. 154(b) by 0 days.

(21) Appl. No.: 19/026,653

(22) Filed: Jan. 17, 2025

(65) Prior Publication Data

US 2025/0364564 A1 Nov. 27, 2025

(30) Foreign Application Priority Data

May 21, 2024 (CN) ......................... 202410633338.4

(51) Int. Cl.
*H01M 4/62* (2006.01)
*C09D 5/24* (2006.01)
(Continued)

(52) U.S. Cl.
CPC ............. *H01M 4/628* (2013.01); *C09D 5/24* (2013.01); *C09D 7/48* (2018.01); *C09D 7/61* (2018.01);
(Continued)

(58) Field of Classification Search
CPC .... H01M 4/628; H01M 4/5825; H01M 4/623; H01M 4/625; H01M 2004/028;
(Continued)

(56) References Cited

U.S. PATENT DOCUMENTS

2014/0144500 A1* 5/2014 Cao .................. H01L 21/02628 252/519.21
2016/0020466 A1 1/2016 Ulbrich et al.
(Continued)

FOREIGN PATENT DOCUMENTS

CN 110797536 A 2/2020
CN 113744928 A 12/2021
(Continued)

OTHER PUBLICATIONS

JP 2011070908 A translation. (Year: 2011).*
(Continued)

*Primary Examiner* — Angela C Brown-Pettigrew
*Assistant Examiner* — Jiajia Janie Cai

(57) ABSTRACT

Disclosed are an additive for a lithium-ion battery and use thereof. The raw materials of the additive for a lithium ion battery have the following parts by weight: 40-70 parts of first solvent; 1-10 parts of first polymer; 5-15 parts of second polymer; 10-20 parts of small molecule organic amine; and 10-20 parts of stabilizer. The first polymer contains at least one nitrogen-free polar functional group; the second polymer contains at least one nitrogen-containing polar functional group; and the stabilizer is a hydrazine compound. The additive provided in the present disclosure is used in lithium-ion batteries to solve the problem of easy cracking of thick electrodes and difficult dispersion of cathode particles.

19 Claims, 4 Drawing Sheets

(51) Int. Cl.

| | |
|---|---|
| ***C09D 7/48*** | (2018.01) |
| ***C09D 7/61*** | (2018.01) |
| ***C09D 7/63*** | (2018.01) |
| ***C09D 7/65*** | (2018.01) |
| ***C09D 7/80*** | (2018.01) |
| ***C09D 127/16*** | (2006.01) |
| ***H01M 4/02*** | (2006.01) |
| ***H01M 4/58*** | (2010.01) |

(52) U.S. Cl.

CPC ................. *C09D 7/63* (2018.01); *C09D 7/65* (2018.01); *C09D 7/80* (2018.01); *C09D 127/16* (2013.01); *H01M 4/5825* (2013.01); *H01M 4/623* (2013.01); *H01M 4/625* (2013.01); *H01M 2004/028* (2013.01)

(58) Field of Classification Search

CPC ... C09D 7/65; C09D 7/61; C09D 7/48; C09D 7/63; C09D 7/80; C09D 5/24; C09D 127/16

See application file for complete search history.

(56) References Cited

U.S. PATENT DOCUMENTS

| | | | | |
|---|---|---|---|---|
| 2020/0028174 | A1 | 1/2020 | Ahn et al. | |
| 2022/0384812 | A1* | 12/2022 | Woo | C08F 236/12 |
| 2023/0250342 | A1 | 8/2023 | Aotani | |

FOREIGN PATENT DOCUMENTS

| | | | | | |
|---|---|---|---|---|---|
| CN | 114050260 | A | * | 2/2022 | H01M 4/62 |
| CN | 117105216 | A | | 11/2023 | |
| EP | 3805154 | A1 | | 4/2021 | |
| EP | 4250403 | A1 | | 9/2023 | |
| JP | 2011070908 | A | * | 4/2011 | |
| JP | 2021077545 | A | * | 5/2021 | |
| WO | WO-2021253302 | A1 | * | 12/2021 | H01M 4/625 |
| WO | WO-2024063003 | A1 | * | 3/2024 | C09C 1/44 |

OTHER PUBLICATIONS

JP 2021077545 A translation. (Year: 2021).*

WO 2024/063003 A1 translation. (Year: 2024).*

CN 114050260 A translation. (Year: 2022).*

The Extended European Search Report Issued on Aug. 6, 2025 for Corresponding European Patent Application No. 25156066.0.

International Search Report Issued on Sep. 9, 2025 for Corresponding PCT Application No. PCT/CN2025/096043.

Written Opinion of the International Searching Authority Issued on Sep. 9, 2025 for Corresponding PCT Application No. PCT/CN2025/096043.

Office Action Issued on Sep. 27, 2025 for Corresponding Chinese Patent Application No. 202510092089.7.

* cited by examiner

| Size μm | Cumu% |
|---|---|
| 0.100 | 0.00 |
| 0.200 | 0.00 |
| 0.500 | 0.00 |
| 1.000 | 0.00 |
| 2.000 | 0.00 |
| 5.000 | 0.21 |
| 10.00 | 6.15 |
| 20.00 | 61.13 |
| 45.00 | 99.88 |
| 75.00 | 100.00 |

| Size μm | Cumu% |
|---|---|
| 0.100 | 0.00 |
| 0.200 | 0.00 |
| 0.500 | 7.33 |
| 1.000 | 18.39 |
| 2.000 | 26.54 |
| 5.000 | 43.67 |
| 10.00 | 69.64 |
| 20.00 | 93.43 |
| 45.00 | 99.98 |
| 75.00 | 100.00 |

| Size μm | Cumu% |
|---|---|
| 0.100 | 0.00 |
| 0.200 | 0.00 |
| 0.500 | 0.94 |
| 1.000 | 18.29 |
| 2.000 | 52.32 |
| 5.000 | 56.53 |
| 10.00 | 85.66 |
| 20.00 | 99.46 |
| 45.00 | 100.00 |
| 75.00 | 100.00 |

ADDITIVE FOR LITHIUM ION BATTERY AND USE THEREOF

CROSS-REFERENCE TO RELATED APPLICATIONS

The present application claims priority of Chinese Patent Application No. 202410633338.4, filed on May 21, 2024, the entire contents of which are hereby incorporated by reference.

TECHNICAL FIELD

The present disclosure relates to the technical field of lithium ion batteries, and in particular to an additive for lithium ion battery and use thereof.

BACKGROUND

In the prior art, an effective way to improve the energy density of lithium ion batteries is to develop and design thick electrodes. However, there are at least two problems with thick electrodes, firstly, they have poor mechanical properties and are prone to cracking, and secondly, the nanosized cathode particles are difficult to disperse therein.

SUMMARY

Based on this, it is necessary to provide an additive that can solve the problems of easy cracking of thick electrodes and difficult dispersion of cathode particles.

An additive for a lithium ion battery, wherein the raw materials of the additive have the following parts by weight:

| | |
|---|---|
| First Solvent | 40-70; |
| First polymer | 1-10; |
| Second polymer | 5-15; |
| Small molecule organic amine | 10-20; and |
| Stabilizer | 10-20; |

The first polymer is at least one of the following: ethyl cellulose, polyvinyl alcohol, polyvinyl butyral, ethylene-vinyl alcohol copolymer, and methyl vinyl ether-maleic anhydride linear copolymer;

The second polymer is at least one of the following: polyvinylpyrrolidone, hydrogenated nitrile rubber, polyacrylonitrile, polypyrrole, and styrene-acrylonitrile-acrylic acid copolymer;

The stabilizer is a hydrazine compound.

The additive for lithium ion batteries provided by this disclosure can be used as a dispersant for conductive agents in lithium ion batteries, which can significantly improve the dispersibility of the conductive agent, reduce the viscosity and fineness of the conductive agent slurry, and lower the resistivity of the electrode sheet.

The additive for lithium ion battery provided in the present disclosure is applied to the cathode slurry mixing process of the lithium ion battery, which can increase the viscosity and solid content of the slurry. Due to the increase in solid content, solvent evaporation is reduced during the production of thick electrode in the slurry mixing process, and the thick electrode is less prone to cracking, thus improving its mechanical properties. In addition, the additive can effectively promote the dispersion of the cathode particles, and at the same time, the viscosity stability of the cathode slurry material is better, and the coating uniformity is improved.

The first solvent dissolves the remaining components of the additive and has no other special function. Commonly used organic solvents may be used. For example, the first solvent is one of N-methylpyrrolidone (NMP), dimethyl sulfoxide, and dimethylformamide. Preferably, the first solvent is N-methylpyrrolidone.

Some optional embodiments are provided below, which are not an additional limitation to the above technical solution, and just further supplements or optimizations to the above technical solution. Without technical or logical contradictions, each optional embodiment may be combined to the above technical solution separately, or it may be combined among the optional embodiments.

Optionally, the raw materials of the additive have the following parts by weight:

| | |
|---|---|
| First Solvent | 40-60; |
| First polymer | 1-5; |
| Second polymer | 9-15; |
| Small molecule organic amine | 15-20; and |
| Stabilizer | 15-20. |

Optionally, the raw materials of the additive have the following parts by weight:

| | |
|---|---|
| First Solvent | 56; |
| First polymer | 1-5; |
| Second polymer | 9-15; |
| Small molecule organic amine | 15-20; and |
| Stabilizer | 15-20. |

Optionally, the first polymer has at least one nitrogen-free polar functional group, the first polymer has polyethylene as the main chain, and the nitrogen-free polar functional group is one of aldehyde, hydroxyl, carbonyl and acid anhydride.

The first polymer has a polyethylene main chain and polar functional groups such as hydroxyl, carboxyl, aldehyde, carbonyl, etc. on the main chain or side chains. Under the action of the polar functional groups, the polymer is soluble in solvents such as NMP. At the same time, the polyethylene hydrophobic structure of the main chain can be adsorbed onto the surface of the cathode active material or the conductive agent such as carbon nanotubes and carbon black, which can generate a steric hindrance in the cathode slurry mixing process or conductive agent dispersion to prevent the secondary agglomeration of the cathode active material or the conductive agent, thereby achieving the effect of maintaining stable viscosity and reducing fineness of the slurry.

Optionally, the first polymer is at least one of the following: ethyl cellulose (e.g., Ashland N7, Ashland N10), polyvinyl alcohol (e.g., Kuraray 3-98; Kuraray 5-98; Kuraray 11-98), polyvinyl butyral (PVB, e.g., Kuraray B30H), ethylene-vinyl alcohol copolymer (e.g., ethylene vinyl alcohol G176; ethylene vinyl alcohol E105), and methyl vinyl ether-maleic anhydride linear copolymer (e.g., Vertellus ZeMace60, Vertellus ZeMace400).

Optionally, the second polymer is at least one of the following: polyvinyl pyrrolidone (PVP, e.g., BASF K17, BASF K30), hydrogenated nitrile rubber (e.g., ARLANXEO 4307, Zannan ZNL3403), polyacrylonitrile (weight-average molecular weight: 80000 to 100000), polypyrrole, and styrene-acrylonitrile-acrylic acid copolymer (e.g., Japan UMGS210B).

The second polymer has nitrogen-containing polar functional groups, wherein nitrogen contains a lone pair of electrons, which can form large π bond with the carbon atom in the cathode material of lithium ion batteries, with good compatibility and providing an alkaline environment.

The first polymer and the second polymer preferably have a molecular weight of 5000 to 200000, and more preferably 5000 to 50000. If the molecular weight of the two is too small, they may decompose during the charging and discharging process of the lithium battery, or dissolve in the electrolyte, resulting in gas production or performance degradation of the battery. If the molecular weight of the two is too large, they may not be soluble in the solvent, or have a high dispersion viscosity in the slurry, without a significant effect on reducing viscosity. At least 5% of the mass of the first polymer and the second polymer is dissolved in NMP, and the viscosity range after dissolution is 10 to 1000 mPa·s. The viscosity range of NMP solution with 5% mass fraction of the first polymer at 25° C. is in the range of 10 to 1000 mPa·s. The viscosity range of NMP solution with 5% mass fraction of the second polymer at 25° C. is also in the range of 10 to 1000 mPa·s.

Unless otherwise specified, the viscosity in this disclosure refers to the viscosity at 25° C.

Optionally, the small molecule organic amine is at least one of the following: ethanolamine, isopropanolamine, isobutanolamine, triethanolamine, anhydrous piperazine, and guanidine carbonate.

The small molecule organic amine is used to adjust the pH value and provide an alkaline environment. It has strong polarity and forms a better wrapping for the conductive agent, thereby improving the wettability of the conductive material and making it easier to disperse.

Optionally, the stabilizer is at least one of the following: hydroxyethyl hydrazine, hydrazine hydrate, and carbohydrazide. Preferably, the stabilizer is hydroxyethyl hydrazine (CAS: 109-84-2). The stabilizer has a nitrogen-hydrazine structure and strong polarity, which can provide lone pairs of electrons and adsorbs onto the surface of cathode particles or carbon particles of lithium ion batteries, increasing the polarity of cathode particles or carbon particles, dispersing and stabilizing the particles, and preventing them from secondary agglomerating in the first solvent.

Optionally, the raw materials of the additive have the following parts by weight:

| | |
|---|---|
| First Solvent | 56; |
| Ethyl cellulose | 1-5; |
| Polyvinylpyrrolidone | 5-10; |
| Isobutanolamine | 15-20; and |
| Hydroxyethyl hydrazine | 15-20. |

Optionally, the raw materials of the additive have the following parts by weight:

| | |
|---|---|
| First Solvent | 56; |
| Ethylene-vinyl alcohol copolymer | 1-2; |
| Polyvinyl butyral | 1-2; |
| Hydrogenated nitrile rubber | 5-10; |
| Isobutanolamine | 15-20; and |
| Hydroxyethyl hydrazine | 15-20. |

Optionally, the raw materials of the additive have the following parts by weight:

| | |
|---|---|
| First Solvent | 56; |
| Polyvinyl butyral | 1-5; |
| Polypyrrole | 10-15; |
| Isopropanolamine | 15-20; and |
| Hydroxyethyl hydrazine | 15-20. |

Optionally, the preparation method of the additive includes the following steps:

dissolving the first polymer in the first solvent to obtain a first polymer solution;

dissolving the second polymer in the first solvent to obtain a second polymer solution; and uniformly mixing the small molecule organic amine, the stabilizer, the first polymer solution and the second polymer solution at a temperature below 50° C. to obtain the additive.

The first polymer and the second polymer may be dissolved in different first solvents separately, that is the first solvent is divided into at least two parts, one part is used to dissolve the first polymer and the other part is used to dissolve the second polymer. Alternatively, the first polymer and the second polymer may be dissolved in the first solvent simultaneously, that is, the first polymer and the second polymer are added into the same first solvent simultaneously, or the first polymer and the second polymer are dissolved sequentially in the first solvent, i.e., one polymer is first added to the first solvent, and then the other polymer is added to the first solvent.

The first polymer and the second polymer can be selected from a variety of different polymers. For polymers that require high-temperature dissolution (such as polyvinyl alcohol, ethylene-vinyl alcohol copolymer, methyl vinyl ether-maleic anhydride linear copolymer, hydrogenated nitrile rubber, polypyrrole and styrene-acrylonitrile-acrylic acid copolymer), they are dissolved at 80-100° C. under nitrogen protection (the dissolution time is selected according to actual needs, for example, 4 h to 8 h). After dissolution, the temperature of the polymers needs to be lowered to below 50° C. before mixed with other components.

For polymers that do not require high-temperature dissolution (e.g., ethyl cellulose, polyvinyl pyrrolidone, polyvinyl butyral), they are dissolved for 0.5 h to 2 h under nitrogen protection.

The components are uniformly mixed under stirring conditions, and the mixing time is in a range of 0.5 h to 2 h.

The present disclosure also provides a use of the additive in a conductive agent.

The conductive agent includes: a second solvent, a conductive material and the additive, wherein the additive is added in an amount of 10% to 20% of the mass of the conductive material.

The second solvent may be common solvents for conductive agents, such as N-methylpyrrolidone (NMP) and dimethylformamide (DMF).

The conductive material is at least one of the following: carbon nanotubes, graphene, carbon black, Ketjen black, and nano carbon fiber (VGCF).

The slurry scraper fineness of the conductive agent is in a range of 10 to 15 μm.

The diaphragm resistivity of the conductive agent is in a range of 14 to 16 mΩ·cm.

The viscosity of the conductive agent slurry is in a range of 400 to 550 mPa·s.

The present disclosure also provides a use of the additive in a cathode slurry of a lithium ion battery.

A cathode slurry of a lithium ion battery, wherein the raw materials have the following parts by weight:

| | |
|---|---|
| Lithium iron phosphate | 100; |
| Conductive agent | 1-5; |
| Adhesive PVDF | 1-5; |
| Additive | 0.1-0.5; and |
| Third Solvent | 40-50. |

The second solvent is a component of the conductive agent, and the third solvent is a component of cathode slurry of a lithium ion battery. The first solvent, the second solvent, and the first solvent in the additive each have specific references, and they may be the same or different solvents.

The third solvent may be N-Methyl-2-pyrrolidone (NMP), dimethylformamide (DMF), and other commonly used solvents for cathode slurries.

The viscosity of the cathode slurry of the lithium ion battery after 24 hours of storage is less than 12000 mPa·s.

The viscosity of the cathode slurry of the lithium ion battery after 24 hours of storage is less than 12000 mPa·s and greater than 9000 mPa·s.

The solid content of the cathode slurry of the lithium ion battery is greater than 65%.

The solid content of the cathode slurry of the lithium ion battery is greater than 65% and less than 70%.

By adding the additive to the cathode slurry of the lithium ion battery, the dispersion of nanosized lithium iron phosphate and conductive agents can be effectively promoted, effectively reducing the viscosity of the cathode slurry material. At the same viscosity level, the solid content in the cathode slurry can be increased by at least 6%, which improves efficiency and reducing consumption, prevents cracking, enhances the viscosity stability, and improves the coating uniformity of the cathode slurry material.

The additive provided in this disclosure has at least the following beneficial effects:

(1) It can be used as a dispersant in the dispersion process of conductive agents such as carbon nanotubes, graphene and carbon black, the usage amount is 10% to 20% of the mass of the conductive agent, which can significantly improve the dispersion of the conductive agent and reduce the viscosity of the slurry, as well as reduce the fineness of the conductive agent slurry and the resistivity of the conductive agent after the conductive agent made into the electrode sheet.

(2) In the slurry mixing process of lithium iron phosphate cathode, after adding the PVDF solution and conductive agent, adding the additive at a dosage of 0.1% to 0.5% of the mass of lithium iron phosphate cathode can significantly increase the solid content of the cathode slurry and reduce its viscosity.

DESCRIPTION OF EMBODIMENTS

Figure 1A:
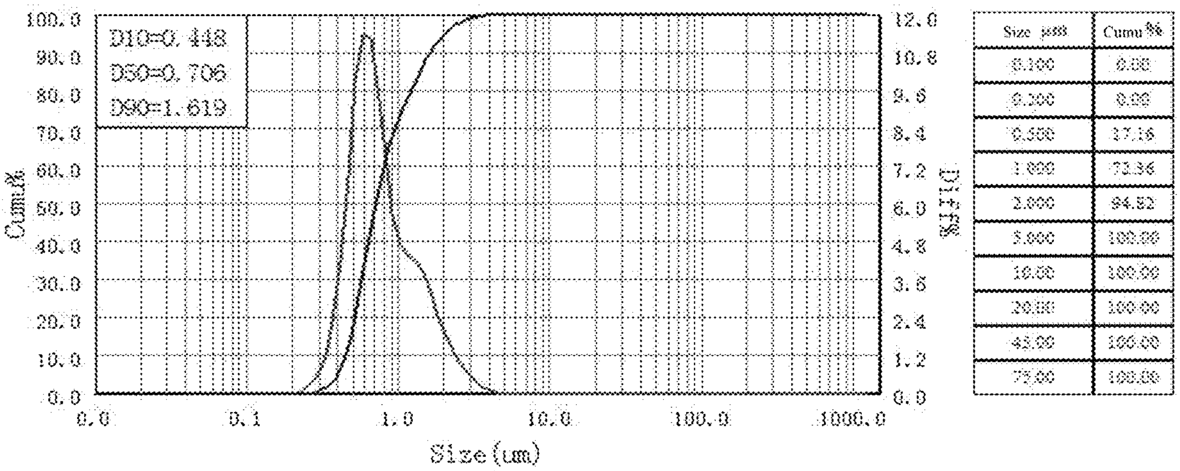
FIG. 1*a* is a particle size test graph of the additive prepared in Embodiment 1 applied to a conductive agent.
Figure 1B:
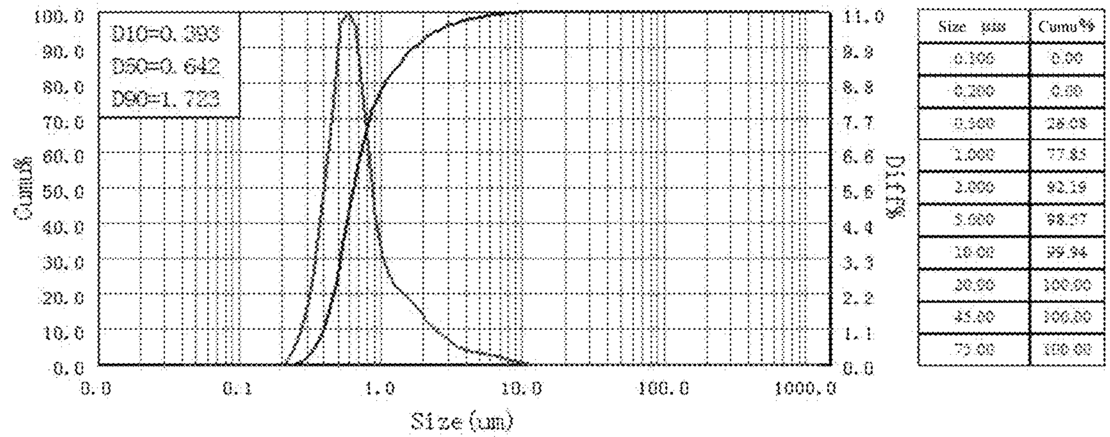
FIG. 1*b* is a particle size test graph of an additive prepared in Embodiment 2 applied to a conductive agent.
Figure 1C:
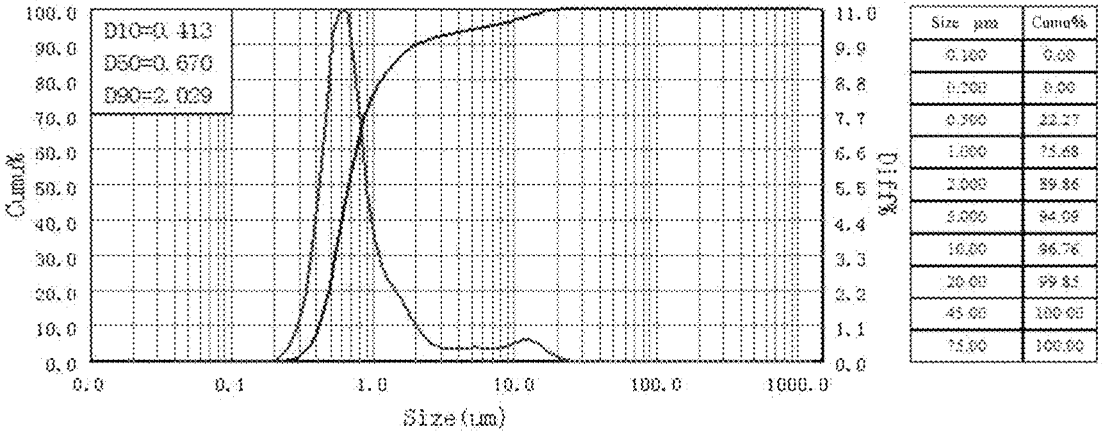
FIG. 1*c* is a particle size test graph of the additive prepared in Embodiment 3 applied to a conductive agent.
Figure 2A:
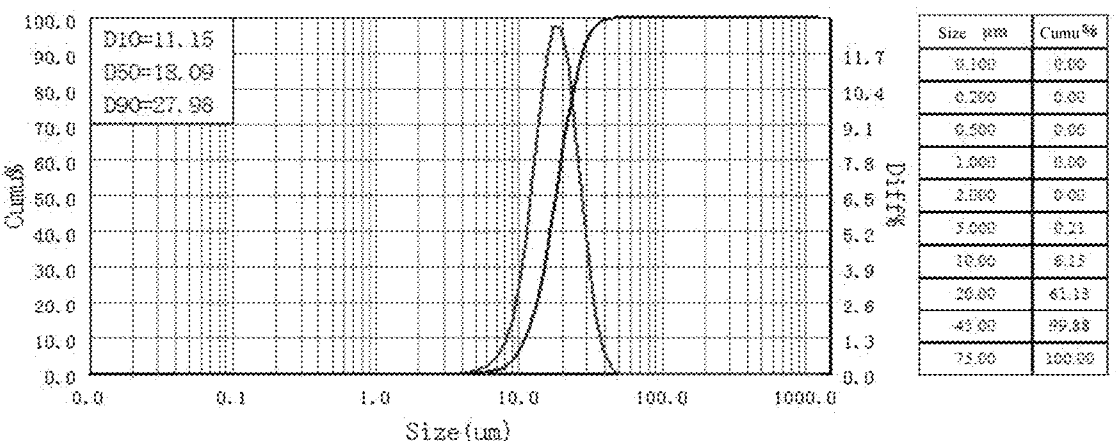
FIG. 2*a* is a particle size test graph of the additive prepared in Control Example 1 applied to a conductive agent.
Figure 2B:
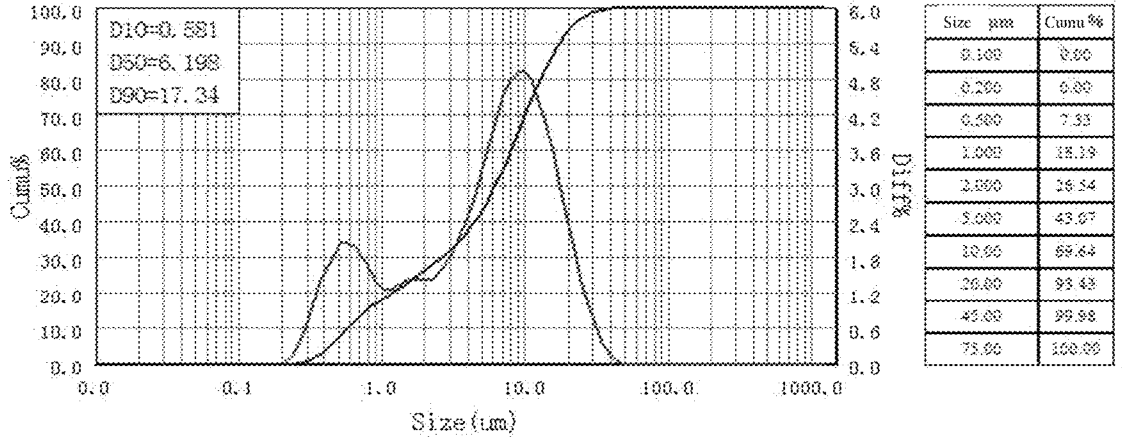
FIG. 2*b* is a particle size test graph of the additive prepared in Control Example 2 applied to a conductive agent.
Figure 2C:
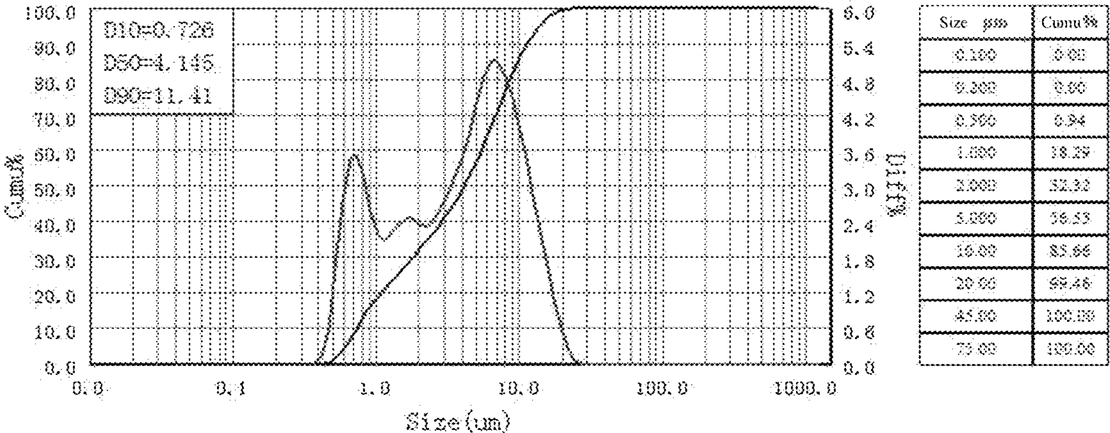
FIG. 2*c* is a particle size test graph of the additive prepared in Control Example 3 applied to a conductive agent.

The technical solutions according to the embodiments of the present disclosure will be described clearly and fully in combination with the drawings according to the embodiments of the present disclosure. Apparently, the described embodiments are not all embodiments of the present disclosure, but only part of the embodiments of the present disclosure. Based on the disclosed embodiments, all other embodiments obtained by those skilled in the art without creative work fall into the scope of this invention.

For better description and illustration of the embodiments of the present disclosure, reference may be made to one or more drawings, however, the additional details or embodiments used to describe the drawings should not be considered as limiting to the scopes of any one of the inventions and creations, embodiments or preferred implementations described here of this disclosure.

Unless otherwise defined, all technical and scientific terms used herein have the same meaning as those commonly understood by those skilled in the art to which this disclosure pertains. The terms used herein in the specification of this disclosure are only for the purpose of describing specific embodiments and are not intended to limit this disclosure.

Embodiment 1

56 parts of N-methylpyrrolidone (NMP) were weighed as the first solvent, and 2.4 parts of ethyl cellulose (i.e., the first polymer, using Ashland N7, wherein the viscosity of NMP solution of 8% ethylcellulose at 25° C. was 50 cPs) with a viscosity of 50 cPs were added into the first solvent at a high temperature of 100° C. under nitrogen protection, and dissolved for 2 hours, and then the temperature was lowered to below 50° C. to obtain a first polymer solution. Then 9.6 parts of polyvinylpyrrolidone (i.e., the second polymer, using BASF K10, wherein the viscosity of the NMP solution of 8% polyvinylpyrrolidone at 25° C. was 15 cPs) with a viscosity of 15 cPs were added into the first polymer solution and dissolved for 1 hour to obtain a mixed solution of first polymer and second polymer. Afterwards, 16 parts of isobutanolamine (i.e., the small molecule organic amine) and 16 parts of hydroxyethylhydrazine (i.e., the stabilizer) were added into the mixed solution of first polymer and second polymer, and the mixed solution was then stirred at a speed of 1200 rpm for 1 hour to obtain an additive.

Embodiment 2

56 parts of N-methylpyrrolidone (NMP) were weighed as the first solvent, and 9.6 parts of hydrogenated nitrile rubber (i.e., the second polymer, using ARLANXEO 4307, wherein viscosity of NMP solution of 6% hydrogenated nitrile rubber at 25° C. was 800 cPs) and 1.2 parts of ethylene-vinyl alcohol copolymer (i.e., the first polymer, using Kuraray G176, wherein viscosity of the NMP solution of 3% ethylene vinyl alcohol copolymer at 25° C. was 100 cPs) were added into the first solvent at a high temperature of 80° C. and under nitrogen protection, and dissolved for 2 hours, and then the temperature was lowered to below 50° C. to obtain a first polymer solution. Then 1.2 parts of polyvinyl butyral (i.e., the first polymer, using Kuraray B60H, wherein viscosity of NMP solution of 3% polyvinyl butyral at 25° C. was 20 cPs) were added into the first polymer solution and dissolved for 1 hour to obtain a mixed solution of the first polymer and the second polymer. Afterwards, 16 parts of isobutanolamine (i.e., the small molecule organic amine) and 16 parts of hydroxyethyl hydrazine (i.e., the stabilizer) were added to the mixed solution of first polymer and second polymer, and the mixed solution was stirred at a speed of 1200 rpm for 1 hour to obtain an additive.

Embodiment 3

50 parts of N-methylpyrrolidone (NMP) were weighed as the first solvent. 15 parts of polypyrrole (i.e., the second polymer, wherein viscosity of the NMP solution of 3% polypyrrole at 25° C. was 100 cPs) were added into the first solvent at 80° C. under nitrogen protection, and dissolved for 2 hours, and then the temperature was lowered to below 50° C. to obtain a second polymer solution. Then 2 parts of polyvinyl butyral (i.e., the first polymer, using Kuraray B60H, wherein viscosity of NMP solution of 6% polyvinyl butyral at 25° C. was 20 cPs) (brand: Kuraray B60H) were added into the second polymer solution and dissolved for 1 hour to obtain a mixed solution of the first polymer and the second polymer. Afterwards, 16 parts of isopropanolamine (i.e., the small molecule organic amine) and 16 parts of hydroxyethyl hydrazine (i.e., the stabilizer) were added into the mixed solution of the first polymer and the second polymer, and the mixed solution was then stirred at a speed of 1200 rpm for 1 hour to obtain an additive.

Control Example 1: No Polymer Added 68 parts of N-methylpyrrolidone (NMP) were weighed as the first solvent, and 16 parts of isobutanolamine and 16 parts of hydroxyethylhydrazine were added into the first solvent, which was then stirred at a speed of 1200 rpm for 1 hour to obtain an additive.

Control Example 2: No Organic Amine or Stabilizer Added 72 parts of N-methylpyrrolidone (NMP) were weighed as the first solvent, and 2.4 parts of ethyl cellulose (i.e., the first polymer, using Ashland N7, wherein the viscosity of NMP solution of 8% ethylcellulose at 25° C. was 50 cPs) were added into the first solvent at a high temperature of 100° C. and under nitrogen protection, and dissolved for 2 hours, and then the temperature was lowered to less than 50° C. to obtain a first polymer solution. Afterwards, 9.6 parts of polyvinylpyrrolidone (i.e., the second polymer, using BASF K10,wherein the viscosity of the NMP solution of 8% polyvinylpyrrolidone at 25° C. was 15 cPs) were added into the first polymer solution and dissolved for 1 hour to obtain an additive.

Control Example 3: No Stabilizer Added 56 parts of N-methylpyrrolidone (NMP) were weighed as the first solvent, 2.4 parts of ethyl cellulose (i.e., the first polymer, using Ashland N7, wherein the viscosity of NMP solution of 8% ethylcellulose at 25° C. was 50 cPs) were added into the first solvent at a high temperature of 100° C. and under nitrogen protection, and the temperature was lowered to below 50° C. after dissolving for 2 hours to obtain a first polymer solution. Then 9.6 parts of polyvinylpyrrolidone (i.e., the second polymer, using BASF K10, wherein the viscosity of the NMP solution of 8% polyvinylpyrrolidone at 25° C. was 15 cPs) were added into the first polymer solution and dissolved for 1 hour to obtain a mixed solution of the first polymer and the second polymer. Afterwards, 32 parts of isopropanolamine were added into the mixed solution of the first polymer and the second polymer, and the mixed solution was then stirred at a speed of 1200 rpm for 1 hour to obtain an additive.

Application Example 1: Application in Conductive Agent 89.3 parts of N-methylpyrrolidone (NMP) were weighed, 6.7 parts of the additive were added and mixed uniformly, and 5 parts of 5-10 nm multi-walled carbon nanotubes were added and ground to disperse with a dispersion line speed of 15 m/s, to obtain a conductive agent. After uniform dispersion, the viscosity, scraper fineness, particle size and diaphragm resistivity of the conductive agent were tested. The test results of the additive prepared in each Embodiment and control Example applied to the conductive agent are shown in Table 1.

TABLE 1

| Ser. No. | Viscosity/ mPa · s | Scraper fineness/ μm | Resistivity/ mΩ · cm | $D_{10}$/ μm | $D_{50}$/ μm | $D_{90}$/ μm | $D_{99}$/ μm | Remark |
|---|---|---|---|---|---|---|---|---|
| Embodiment 1 | 436 | 10 | 16 | 0.448 | 0.706 | 1.619 | 2.911 | |
| Embodiment 2 | 487 | 15 | 18 | 0.393 | 0.642 | 1.723 | 5.749 | |
| Embodiment 3 | 523 | 10 | 14 | 0.413 | 0.670 | 2.029 | 14.96 | |
| Control Example 1 | 1320 | >100 | 87 | 11.15 | 18.09 | 27.98 | 37.83 | Delamination, solid-liquid separation |

TABLE 1-continued

| Ser. No. | Viscosity/ mPa · s | Scraper fineness/ μm | Resistivity/ mΩ · cm | $D_{10}$/ μm | $D_{50}$/ μm | $D_{90}$/ μm | $D_{99}$/ μm | Remark |
|---|---|---|---|---|---|---|---|---|
| Control Example 2 | 8760 | 25 | 23 | 0.581 | 6.198 | 17.34 | 30.78 | With greater viscosity, particle size and diaphragm resistivity |
| Control Example 3 | 1450 | 30 | 20 | 0.726 | 4.145 | 11.41 | 18.47 | With larger maximum particles |

As shown in Table 1, the viscosity of the conductive agent slurry with the additive of Embodiments 1 to 3 is smaller than that of the conductive agent slurry with the additive of Control Examples 1 to 3.

Based on the data in Table 1, it can be seen that the conductive agent slurry with the additive of Embodiments 1 to 3 have smaller fineness.

As shown in Table 1, the resistivity of the conductive agent slurry with the additive of Embodiments 1 to 3 are smaller than that of the conductive agent slurry with the additive of control Examples 1 to 3.

The addition of additives in Embodiments 1 to 3 reduces the viscosity, fineness, and resistivity of the conductive agent slurry, which can be shown to improve the dispersion properties of the conductive agent very well.

Application Example 2: Application in Cathode Slurry

The cathode slurry was prepared in the ratio of lithium iron phosphate: carbon black: binder PVDF: additive: NMP=97:1:2.5:0.2:43.67. After the cathode slurry was prepared, the viscosity was tested at the initial stage, after 2 hours, 4 hours, 8 hours, and 24 hours, and the viscosity and diaphragm resistance were tested, too. The results are shown in Table 2.

In Table 2, no additive was added in the Reference Example.

TABLE 2

| Ser. No. | Initial viscosity/ mPa · s | 2-hour viscosity/ mPa · s | 4-hour viscosity/ mPa · s | 8-hour viscosity/ mPa · s | 24-hour viscosity/ mPa · s | Diaphragm resistance/ Ω · cm | Remark |
|---|---|---|---|---|---|---|---|
| Reference Example | 45000 | 65000 | 72000 | 74500 | 78900 | 65.4 | No other additive |
| Embodiment 1 | 3653 | 4131 | 4819 | 5237 | 9813 | 55.4 | |
| Embodiment 2 | 4113 | 4475 | 4870 | 5170 | 10085 | 68.4 | |
| Embodiment 3 | 3013 | 3505 | 3922 | 4472 | 8987 | 61.3 | |
| Control Example 1 | 4053 | 8760 | 12300 | 18400 | 20500 | 58.4 | Large viscosity rebound |
| Control Example 2 | 37600 | 56750 | 65740 | 72500 | 76800 | 58.4 | High viscosity |
| Control Example 3 | 9863 | 12450 | 15320 | 17540 | 17850 | 63.5 | Viscosity decreases but remains high |

Figure 3A:
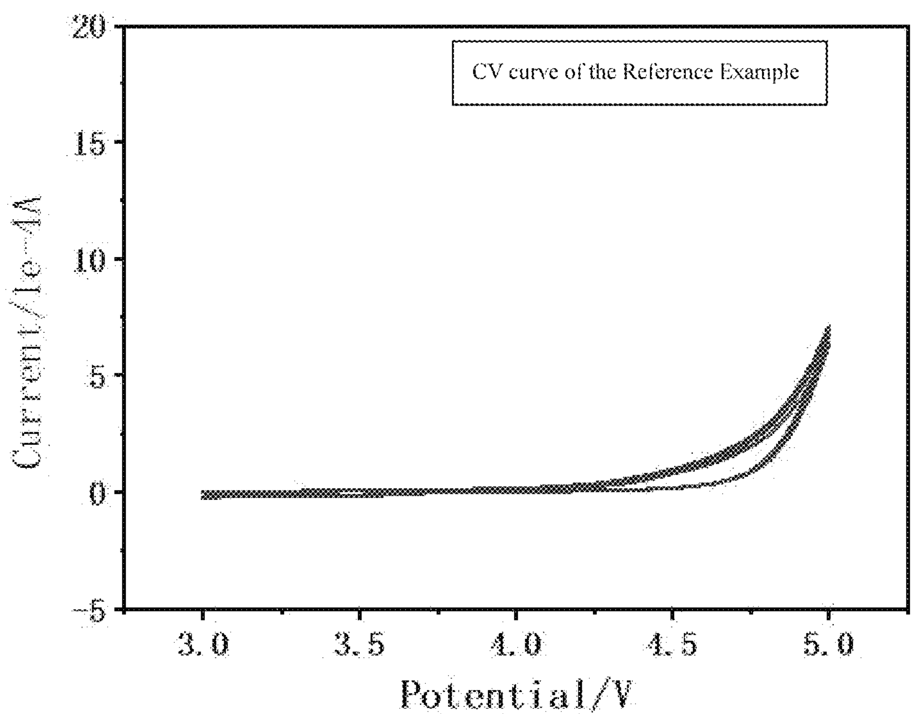
FIG. 3*a* is an electrochemical performance test graph of a cathode slurry prepared in the Reference Example.
Figure 3B:
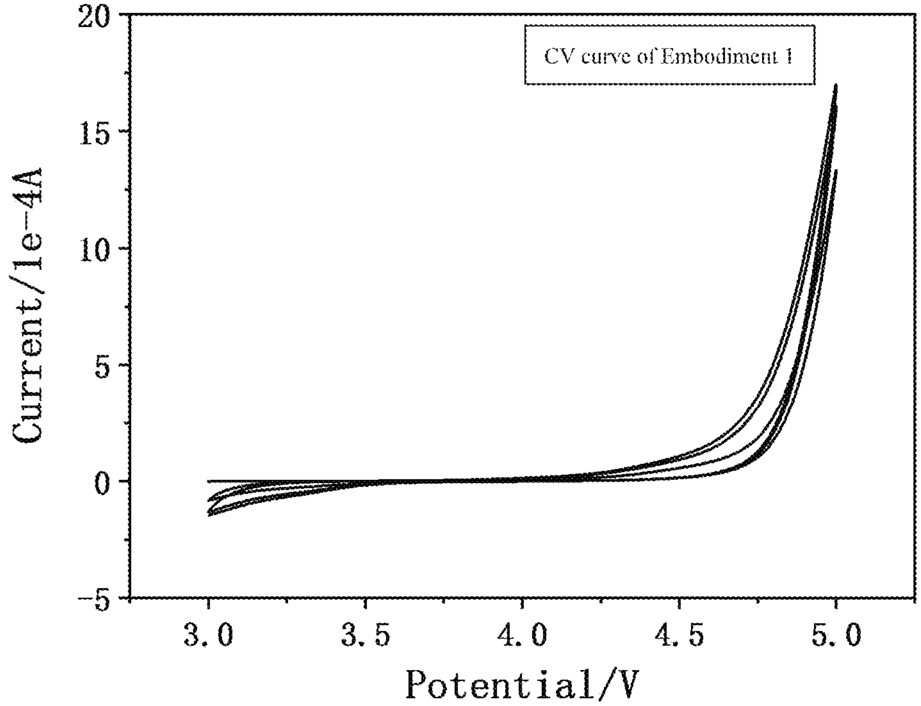
FIG. 3*b* is an electrochemical performance test graph of the additive prepared in Embodiment 1 applied to cathode slurry.

The CV curve of the cathode slurry prepared in the Reference Example is shown in FIG. 3*a*, and the CV curve of the cathode slurry having the additive prepared in Embodiment 1 is shown in FIG. 3*b*. It can be seen that there is no significant difference in the electrochemical performance test between the cathode slurry with additives and the normal one without additives. The additive of the embodiments has no obvious redox peaks at voltages above 4.5V, without decomposition, indicating that the additive is stable in the battery and does not undergo any side reactions, and is thus eligible to be applied in a high-voltage system.

As shown in Table 2, after adding the additive prepared in each embodiment, the viscosity of the cathode slurry is significantly reduced, and the diaphragm resistivity is slightly decreased, indicating that the viscosity of the cathode slurry can be reduced by introducing the additive. Therefore, in the actual production of thick electrodes, the content of active ingredients can be increased and the amount of the third solvent can be reduced, which can improve the baking efficiency of the electrodes and prevent the electrodes from cracking. Meanwhile, the diaphragm resistivity of the cathode slurry with additive is basically the same as that without additive, indicating that the additives will not affect the internal resistance of the battery. Although the additive of the disclosure is not conductive, it can help disperse the cathode and conductive agent, improving the overall battery performance.

Battery Performance Characterization Test

Cathode slurry was prepared according to the configuration shown in Table 3, and battery cells were made to test the AC internal resistance, platform voltage, and DC internal resistance.

TABLE 3

| Parameter | Experiment 1 | Experiment 2 | Experiment 3 |
|---|---|---|---|
| System | 280 Iron-Lithium System | | |
| Cathode | 280 Iron-Lithium ratio | Iron-lithium ratio with addition of | Iron-lithium ratio with addition of |

TABLE 3-continued

| Parameter | Experiment 1 | Experiment 2 | Experiment 3 |
|---|---|---|---|
| | | 0.2% of additive prepared in Control Example 1 | 0.03% of additive prepared in Embodiment 1 |
| Mixing process | Wet Mixing Process | Wet Mixing Process | Wet Mixing Process |
| Solid content/% | 60.2 | 66.1 | 66.6 |
| Slurry viscosity/Mpa · s | 4100 | 4210 | 4010 |
| Slurry fineness/μm | 40 | 40 | 40 |

The ratio of 280 lithium iron cathode slurry is lithium iron phosphate: carbon black: binder PVDF: NMP=97:1:2.5: 43.67.

In Experiment 2, 0.2% of the additive prepared in control Example 1 was added, that is, the amount of the additive prepared in control Example 1 was 0.2% of the mass of the lithium iron phosphate. Similarly, in Experiment 3, 0.03% of the additive prepared in Embodiment 1 was added, that is, the amount of the additive prepared in Embodiment 1 was 0.03% of the mass of the lithium iron phosphate.

As shown in Table 3, the solid content in Experiment 3 was increased to 66.6%, and the slurry viscosity in Experiment 3 was reduced to 4010 Mpa·s.

The cathode slurry prepared in Experiments 1, 2 and 3 showed no obvious abnormalities such as particles and scratches during the electrode sheet coating process, as well as belt breakage or wrinkles during rolling.

Figure 4:
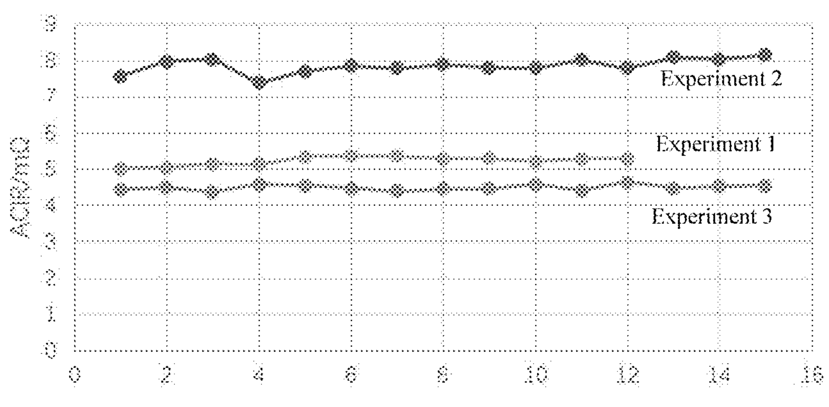
FIG. 4 shows the AC internal resistance (ACIR) test graph of the battery cells prepared in Experiments 1 to 3, in which the horizontal axis represents the number of battery packs.

As shown in FIG. 4, in Experiment 2, the AC internal resistance of the battery cell increased after adding the additive prepared in Control Example 1, while in Experiment 3, the AC internal resistance of the battery cell decreased by more than 30% after adding the additive prepared in Embodiment 1.

Figure 5:
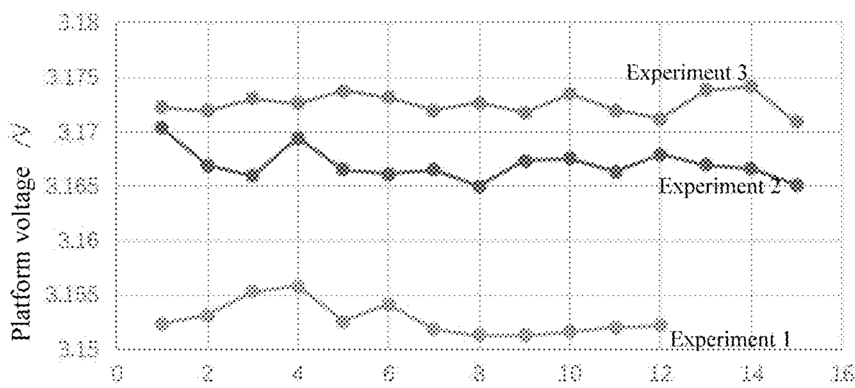
FIG. 5 is a battery voltage test graph of the battery cells prepared in Experiments 1 to 3, in which the horizontal axis represents the number of battery packs.

As shown in FIG. 5, the platform voltage in Experiments 2 and 3 increased by about 5%, while the platform voltage in Experiment 1 was relatively low.

Figure 6:
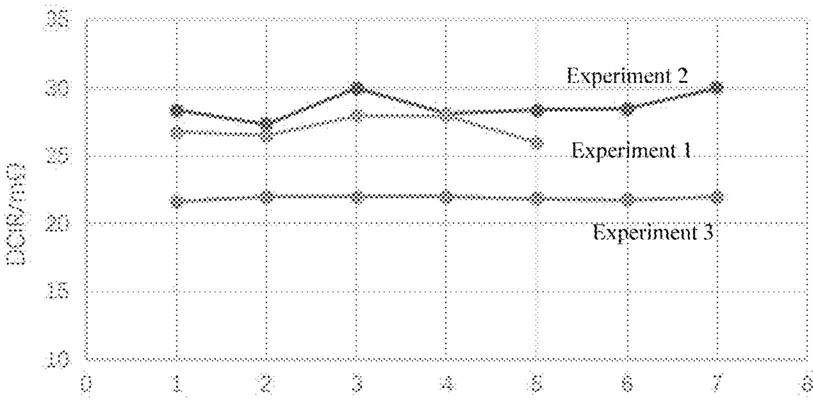
FIG. 6 is a DC internal resistance (DCIR) test graph of the battery cells prepared in Experiments 1 to 3, in which the horizontal axis represents the number of battery packs.

As shown in FIG. 6, in Experiment 3, the DC internal resistance of the battery cell was reduced by nearly 50% after adding the additive prepared in Embodiment 1.

The test results of the standard charge and discharge energy retention rate (1P/0.5P; 2P/0.5P) in Experiments 1, 2, and 3 are shown in Tables 4 and 5. In Experiment 3, the 0.5P voltage platform and 2P charge energy retention rate of the battery cell had been significantly improved after adding the additive prepared in the Embodiment 1.

TABLE 4

| Battery cell | 0.5 P charge capacity/ Ah | 0.5 P charge energy/ Wh | 0.5 P discharge capacity/ Ah | 0.5 P discharge energy/ Wh | 0.5 P platform voltage/ V | 1 P charge capacity/ Ah | 1 P charge energy/ W | 1 P discharge capacity/ Ah | 1 P discharge energy/ W |
|---|---|---|---|---|---|---|---|---|---|
| Experiment 1 | 4.342 | 14.796 | 4.335 | 13.714 | 3.1636 | 4.22 | 14.621 | 4.029 | 12.431 |
| Experiment 1 | 4.403 | 14.982 | 4.42 | 13.981 | 3.1631 | 4.289 | 14.843 | 4.125 | 12.72 |
| Experiment 1 | 4.401 | 14.977 | 4.41 | 13.953 | 3.1639 | 4.284 | 14.831 | 4.132 | 12.745 |
| Average value | | | | | 3.1635 | | | | |
| Experiment 2 | 4.413 | 14.995 | 4.42 | 14.053 | 3.1794 | 4.307 | 14.835 | 4.119 | 12.838 |
| Experiment 2 | 4.419 | 15.019 | 4.423 | 14.029 | 3.1718 | 4.306 | 14.862 | 4.114 | 12.762 |
| Experiment 2 | 4.413 | 14.987 | 4.414 | 14.014 | 3.1749 | 4.308 | 14.836 | 4.122 | 12.824 |
| Average value | | | | | 3.1754 | | | | |
| Experiment 3 | 4.564 | 15.468 | 4.569 | 14.547 | 3.1838 | 4.476 | 15.369 | 4.228 | 13.39 |
| Experiment 3 | 4.547 | 15.427 | 4.559 | 14.528 | 3.1867 | 4.464 | 15.34 | 4.29 | 13.405 |
| Experiment 3 | 4.554 | 15.437 | 4.555 | 14.51 | 3.1855 | 4.457 | 15.314 | 4.267 | 13.329 |
| Average value | | | | | 3.1853 | | | | |

TABLE 5

| Battery cell | 1 P charge energy retention rate/ % | 1 P discharge energy retention rate/ % | 2 P charge capacity/ Ah | 2 P charge energy/ W | 2 P discharge capacity/ Ah | 2 P discharge energy/ W | 2 P charge energy retention rate/ % | 2 P discharge energy retention rate/ % |
|---|---|---|---|---|---|---|---|---|
| Experiment 1 | 98.82 | 90.64 | 3.727 | 13.216 | 3.681 | 10.913 | 89.32 | 79.58 |
| Experiment 1 | 99.07 | 90.98 | 3.819 | 13.541 | 3.747 | 11.088 | 90.38 | 79.31 |
| Experiment 1 | 99.03 | 91.34 | 3.817 | 13.532 | 3.782 | 11.197 | 90.35 | 80.25 |
| Average value | 98.97 | 90.99 | | | | | 90.02 | 79.71 |
| Experiment 2 | 98.93 | 91.35 | 4.049 | 14.239 | 3.768 | 11.393 | 94.96 | 81.07 |
| Experiment 2 | 98.95 | 90.97 | 3.926 | 13.873 | 3.728 | 11.16 | 92.37 | 79.55 |
| Experiment 2 | 98.99 | 91.51 | 4.048 | 14.236 | 3.786 | 11.415 | 94.99 | 81.45 |
| Average value | 98.21 | 91.24 | | | | | 92.28 | 79.87 |
| Experiment 3 | 99.36 | 92.05 | 4.243 | 14.875 | 3.913 | 11.855 | 96.17 | 81.49 |
| Experiment 3 | 99.44 | 92.27 | 4.216 | 14.782 | 3.937 | 11.941 | 95.82 | 82.19 |
| Experiment 3 | 99.20 | 91.86 | 4.21 | 14.771 | 3.883 | 11.767 | 95.69 | 81.10 |
| Average value | 99.33 | 92.06 | | | | | 95.89 | 81.59 |

The test results of the standard charge and discharge energy retention rate (1P/0.5P; 2P/0.5P) of Experiments 1, 2, and 3 are shown in Table 6 and Table 7. In Experiment 3, the platform voltage and 1P and 2P charge and discharge energy efficiency of the battery had been significantly improved after adding the additive prepared in Embodiment 1.

TABLE 6

| Battery cell | 0.5 P charge capacity/ Ah | 0.5 P charge energy/ Wh | 0.5 P discharge capacity/ Ah | 0.5 P discharge energy/ Wh | 0.5 P platform voltage/ V | 0.5 P charge & discharge energy efficiency/ % | 1 P charge capacity/ Ah | 1 P charge energy/ Wh | 1 P discharge capacity/ Ah | 1 P discharge energy/ W |
|---|---|---|---|---|---|---|---|---|---|---|
| Experiment 1 | 4.342 | 14.796 | 4.335 | 13.714 | 3.1636 | 92.69 | 4.134 | 14.322 | 3.937 | 12.152 |
| Experiment 1 | 4.403 | 14.982 | 4.42 | 13.981 | 3.1631 | 93.32 | 4.204 | 14.559 | 4.032 | 12.447 |
| Experiment 1 | 4.401 | 14.977 | 4.41 | 13.953 | 3.1639 | 93.16 | 4.205 | 14.564 | 4.036 | 12.457 |
| Average value | | | | | 3.1635 | 93.06 | | | | |
| Experiment 2 | 4.413 | 14.995 | 4.42 | 14.053 | 3.1794 | 93.72 | 4.199 | 14.466 | 4.033 | 12.584 |
| Experiment 2 | 4.419 | 15.019 | 4.423 | 14.029 | 3.1718 | 93.41 | 4.198 | 14.495 | 4.024 | 12.508 |
| Experiment 2 | 4.413 | 14.987 | 4.414 | 14.014 | 3.1749 | 93.51 | 4.201 | 14.471 | 4.033 | 12.563 |
| Average value | | | | | 3.1754 | 93.54 | | | | |
| Experiment 3 | 4.564 | 15.468 | 4.569 | 14.547 | 3.1838 | 94.05 | 4.373 | 15.027 | 4.198 | 13.124 |
| Experiment 3 | 4.547 | 15.427 | 4.559 | 14.528 | 3.1867 | 94.17 | 4.36 | 14.997 | 4.193 | 13.119 |
| Experiment 3 | 4.554 | 15.437 | 4.555 | 14.51 | 3.1855 | 93.99 | 4.335 | 14.973 | 4.178 | 13.067 |
| Average value | | | | | 3.1853 | 94.07 | | | | |

TABLE 7

| Battery cell | 1 P continuous discharge platform voltage/ V | 1 P charge and discharge energy efficiency/ % | 2 P charge capacity/ Ah | 2 P charge energy/ W | 2 P discharge capacity/ Ah | 2 P discharge energy/ W | 2 P continuous discharge platform voltage/ V | 2 P charge and discharge energy efficiency/ % |
|---|---|---|---|---|---|---|---|---|
| Experiment 1 | 3.0866 | 84.85 | 3.746 | 13.276 | 3.235 | 9.617 | 2.9728 | 72.44 |
| Experiment 1 | 3.0871 | 85.49 | 3.823 | 13.548 | 3.31 | 9.82 | 2.9668 | 72.48 |
| Experiment 1 | 3.0865 | 85.53 | 3.817 | 13.526 | 3.329 | 9.878 | 2.9673 | 73.03 |
| Average value | 3.0867 | 85.29 | | | | | 2.9689 | 72.65 |
| Experiment 2 | 3.1203 | 86.99 | 4.053 | 14.238 | 3.518 | 10.672 | 3.0335 | 74.95 |
| Experiment 2 | 3.1083 | 86.29 | 3.981 | 14.034 | 3.419 | 10.267 | 3.0029 | 73.16 |
| Experiment 2 | 3.1151 | 86.82 | 4.046 | 14.218 | 3.527 | 10.67 | 3.0252 | 75.05 |
| Average value | 3.1146 | 86.70 | | | | | 3.0206 | 74.39 |
| Experiment 3 | 3.1263 | 87.34 | 4.226 | 14.814 | 3.662 | 11.129 | 3.0390 | 75.12 |
| Experiment 3 | 3.1288 | 87.48 | 4.197 | 14.715 | 3.657 | 11.128 | 3.0429 | 75.62 |
| Experiment 3 | 3.1276 | 87.27 | 4.201 | 14.731 | 3.629 | 11.029 | 3.0391 | 74.87 |
| Average value | 3.1275 | 87.36 | | | | | 3.0404 | 75.21 |

As shown in Table 8, there is substantially no difference in the high temperature charge and discharge performance of the batteries in Experiments 1, 2 and 3.

TABLE 8

| | 25° C. | | | | | 45° C. | | | | | |
|---|---|---|---|---|---|---|---|---|---|---|---|
| Battery cell | Charge capacity/ Ah | Charge energy/ W | Discharge capacity/ Ah | Discharge energy/ W | Charge capacity/ Ah | Charge energy/ W | Discharge capacity/ Ah | Discharge energy/ W | Charge energy retention/ % | Discharge energy retention/ % | Charge and discharge efficiency/ % |
| Experiment 1 | 4.537 | 15.41 | 4.348 | 13.753 | 4.485 | 15.138 | 4.713 | 15.106 | 98.23 | 109.84 | 99.79 |
| Experiment 1 | 4.547 | 15.45 | 4.361 | 13.788 | 4.492 | 15.154 | 4.71 | 15.121 | 98.08 | 109.67 | 99.78 |
| Average value | | | | | | | | | 98.16 | 109.75 | 99.79 |
| Experiment 2 | 4.6214 | 15.772 | 4.5308 | 14.276 | 4.605 | 15.568 | 4.8925 | 15.659 | 98.71 | 109.69 | 100.58 |
| Experiment 2 | 4.5891 | 15.659 | 4.5345 | 14.32 | 4.5706 | 15.428 | 4.9067 | 15.762 | 98.53 | 110.07 | 102.17 |

TABLE 8-continued

| Battery cell | 25° C. Charge capacity/ Ah | Charge energy/ W | Discharge capacity/ Ah | Discharge energy/ W | 45° C. Charge capacity/ Ah | Charge energy/ W | Discharge capacity/ Ah | Discharge energy/ W | Charge energy retention/ % | Discharge energy retention/ % | Charge and discharge efficiency/ % |
|---|---|---|---|---|---|---|---|---|---|---|---|
| Average value | | | | | | | | | 98.62 | 109.88 | 101.37 |
| Experiment 3 | 4.7484 | 16.106 | 4.5351 | 14.382 | 4.7112 | 15.844 | 4.9264 | 15.868 | 98.37 | 110.33 | 100.16 |
| Experiment 3 | 4.901 | 16.608 | 4.6259 | 14.674 | 4.8413 | 16.284 | 5.0278 | 16.192 | 98.04 | 110.35 | 99.44 |
| Average value | | | | | | | | | 98.21 | 110.34 | 99.80 |

The technical features of the above-described embodiments may be arbitrarily combined. For the sake of brevity of description, not all possible combinations of the technical features in the above embodiments are described. However, where no contradiction exists, all the combinations of these technical features are contemplated in the scope of the present disclosure.

The above-described embodiments are merely illustrative of several implementations of the present invention, and the description is specific and particular, but is not to be construed as limiting the scope of the present disclosure. It should be pointed out that for those of ordinary skill in the art, several variations and improvements can be made without departing from the concept of the present disclosure, which are all regarded as falling within the protection scope of the present disclosure. Therefore, the protection scope of the present disclosure is defined by the appended claims.

What is claimed is:

1. An additive for a lithium ion battery, the additive being free of conductive material, wherein raw materials of the additive have following parts by weight:

| | |
|---|---|
| first solvent | 40-70; |
| first polymer | 1-10; |
| second polymer | 5-15; |
| small molecule organic amine | 10-20; and |
| stabilizer | 10-20; |

wherein the first polymer has at least one nitrogen-free polar functional group, with polyethylene as a main chain, and the first polymer is at least one of the following: ethyl cellulose, polyvinyl alcohol, polyvinyl butyral, ethylene-vinyl alcohol copolymer, and methyl vinyl ether-maleic anhydride linear copolymer;

wherein the second polymer has a nitrogen-containing polar functional group, and the second polymer is at least one of the following: polyvinyl pyrrolidone, hydrogenated nitrile rubber, polyacrylonitrile, polypyrrole, and styrene-acrylonitrile-acrylic acid copolymer; and the stabilizer is a hydrazine compound;

wherein the stabilizer is at least one of the following: hydroxyethylhydrazine, hydrazine hydrate and carbohydrazide, and the nitrogen-free polar functional group is one of the following: aldehyde, hydroxyl, carbonyl, and acid anhydride.

2. The additive for a lithium ion battery according to claim 1, wherein the raw materials of the additive have the following parts by weight:

| | |
|---|---|
| the first solvent | 40-60; |
| the first polymer | 1-5; |
| the second polymer | 9-15; |
| the small molecule organic amine | 15-20; and |
| the stabilizer | 15-20. |

3. The additive for a lithium ion battery according to claim 1, wherein the raw materials of the additive have the following parts by weight:

| | |
|---|---|
| the first solvent | 56; |
| the first polymer | 1-5; |
| the second polymer | 9-15; |
| the small molecule organic amine | 15-20; and |
| the stabilizer | 5-20. |

4. The additive for a lithium ion battery according to claim 1, wherein the raw materials of the additive have the following parts by weight:

| | |
|---|---|
| the first solvent | 56; |
| ethyl cellulose | 1-5; |
| polyvinylpyrrolidone | 5-10; |
| isobutanolamine | 15-20; and |
| hydroxyethyl hydrazine | 15-20. |

5. The additive for a lithium ion battery according to claim 1, wherein the raw materials of the additive have the following parts by weight:

| | |
|---|---|
| the first solvent | 56; |
| ethylene-vinyl alcohol copolymer | 1-2; |
| polyvinyl butyral | 1-2; |
| hydrogenated nitrile rubber | 5-10; |
| isobutanolamine | 15-20; and |
| hydroxyethyl hydrazine | 15-20. |

6. The additive for a lithium ion battery according to claim 1, wherein the raw materials of the additive have the following parts by weight:

| | |
|---|---|
| the first solvent | 56; |
| polyvinyl butyral | 1-5; |
| polypyrrole | 10-15; |
| isopropanolamine | 15-20; and |
| hydroxyethyl hydrazine | 15-20. |

7. The additive for a lithium ion battery according to claim 1, wherein the small molecule organic amine is at least one of the following: ethanolamine, isopropanolamine, isobutanolamine, triethanolamine, anhydrous piperazine and guanidine carbonate.

8. A preparation method of the additive for a lithium ion battery according to claim 1, comprising the following steps of:

dissolving the first polymer in the first solvent to obtain a first polymer solution;

dissolving the second polymer in the first solvent to obtain a second polymer solution; and uniformly mixing the small molecule organic amine, the stabilizer, the first polymer solution and the second polymer solution at a temperature below 50° C. to obtain the additive.

9. The preparation method according to claim 8, wherein the small molecule organic amine, the stabilizer, the first polymer solution and the second polymer solution are uniformly mixed under a stirring condition for 0.5 h to 2 h.

10. A conductive agent comprising:

a second solvent;

a conductive material; and the additive according to claim 1, wherein added amount of the additive is 10% to 20% of mass of the conductive material, and the conductive material is at least one selected from carbon nanotubes, graphene, and nano-carbon fibers.

11. The conductive agent according to claim 10, wherein slurry scraper fineness of the conductive agent is in a range of 10 μm to 15 μm.

12. The conductive agent according to claim 10, wherein diaphragm resistivity of the conductive agent is in a range of 14 to 16 mΩ·cm.

13. The conductive agent according to claim 10, wherein slurry viscosity of the conductive agent is in a range of 400 to 550 mPa·s.

14. A cathode slurry for a lithium ion battery containing the additive according to claim 1, wherein raw materials have the following parts by weight:

| | |
|---|---|
| lithium iron phosphate | 100; |
| conductive agent | 1-5; |
| adhesive PVDF | 1-5; |
| the additive | 0.1-0.5; and |
| third solvent | 40-50. |

15. The cathode slurry for a lithium ion battery according to claim 14, wherein solid content of the cathode slurry for a lithium ion battery is greater than 65%.

16. The cathode slurry for a lithium ion battery according to claim 14, wherein solid content of the cathode slurry for a lithium ion battery is greater than 65% and less than 70%.

17. The cathode slurry for a lithium ion battery according to claim 14, wherein viscosity of the cathode slurry for a lithium ion battery after 24hours of storage is less than 12000 mPa·s.

18. The cathode slurry for a lithium ion battery according to claim 14, wherein the viscosity of the cathode slurry for a lithium ion battery after 24 hours of storage is less than 12000 mPa·s and greater than 9000 mPa·s.

19. The additive for a lithium ion battery according to claim 1, wherein a weight ratio of the small molecule organic amine to the stabilizer is 1:1.

* * * * *